United States Patent [19]
White

[11] Patent Number: 5,587,223
[45] Date of Patent: Dec. 24, 1996

[54] HIGH DENSITY MAGNETIC INFORMATION STORAGE MEDIUM

[75] Inventor: Robert L. White, Stanford, Calif.

[73] Assignee: Board of Trustees Leland Stanford, Jr. University, Stanford, Calif.

[21] Appl. No.: 270,201

[22] Filed: Jun. 30, 1994

Related U.S. Application Data

[63] Continuation of Ser. No. 963,562, Oct. 19, 1992, abandoned.

[51] Int. Cl.$^6$ ................................ G11B 5/66; B32B 3/00
[52] U.S. Cl. ..................... 428/195; 428/218; 428/692; 428/694 R; 428/694 T; 428/694 TR; 428/336; 428/900; 427/128; 427/130; 283/82
[58] Field of Search .................................. 428/195, 218, 428/692, 694 R, 900, 694 T, 694 TR; 283/336, 82; 427/128, 130

[56] References Cited

U.S. PATENT DOCUMENTS

| 4,274,935 | 6/1981 | Schmelzer | 365/50 |
| 4,670,353 | 6/1987 | Sakurai | 428/606 |
| 4,746,580 | 5/1988 | Bishop et al. | 428/557 |
| 4,935,278 | 6/1990 | Krounbi | 428/65.5 |

FOREIGN PATENT DOCUMENTS

| 99253 | 3/1992 | Japan . |
| 84403 | 3/1992 | Japan . |

*Primary Examiner*—Leszek Kiliman
*Attorney, Agent, or Firm*—Claude A.S. Hamrick

[57]  ABSTRACT

Magnetic recording media comprising an ordered, ultra-high density array of 500 Å diameter circular magnetic thin film islands on a substrate. The magnetic material supports magnetization perpendicular to the film plan, and each circular island comprises a single magnetic domain and a single information storage bit. An areal bit density of $10^{11}$ bits/in$^2$ can be achieved by such an array. The magnetic array is generated using a single level mask comprised of a self-ordering polymer array, either an array of polymer spheres or a regular array of polymeric blocks in a phase-separating polymer film.

14 Claims, 2 Drawing Sheets

HIGH DENSITY MAGNETIC INFORMATION STORAGE MEDIUM

This is a continuation of application Ser. No. 07/963,562 filed on Oct. 19, 1992, now abandoned.

BACKGROUND OF THE INVENTION

1. Field of the Invention

This invention relates to information storage media and, more particularly, to high density magnetic information storage media which comprises a plurality of discrete islands of magnetic material.

2. Background of the Invention

Present day high density magnetic information storage media contain small magnetic grains, usually in a thin metallic film. In this media, it is usual for one information storage bit to be stored in a region of the film which contains a large number of magnetic grains and which is magnetized coherently in one of two preferred directions—usually referred to as "up" and "down," even though the actual direction of magnetization may not be perpendicular to the film or other form of media on which the magnetic grains are deposited.

The demands of high density information storage have led to magnetic grains in the metal films with dimensions as small as 100 to 150 Å (10 to 15 nm) which, in turn, has resulted in a large number of grains, on the order of thousands or tens of thousands, being contained within each individual information storage bit. Nonetheless, the recording medium remains fundamentally granular and the grains have a large dispersion (by a factor of two) in size. This granularity leads to media noise in the magnetic switching process, which gets worse as the bit size, hence the number of grains in a bit, becomes smaller. Although an ideal medium (with a constant grain size and containing N number of particles in each bit) results in a signal-to-noise ratio proportional to $(N)^{1/2}$, the actual practical situation is much worse because of the irregularity in particle size, particle packing and particle interactions due to exchange coupling and demagnetization fields. Present day commercial hard disk storage media have a bit density of roughly 100 Mb/in$^2$. Today's technology reaches physical limitation at $10^8$ and $10^9$ Mb/in$^2$.

From the above, then, it appears that the contiguous granular media approach provides significant limitations to pushing the media significantly farther in the direction of smaller bit size and higher areal density, and therefore the need is for a different approach to high density magnetic storage media.

SUMMARY OF THE INVENTION

Objects of the Invention

It is therefore an object of this invention to provide an ultra high density magnetic information storage medium.

It is a further object of this invention to create a magnetic information storage medium consisting of an ordered array of magnetic islands of regular size and shape and which utilizes one island per bit of information stored.

Still a further object of this invention is provide a magnetic information storage medium which has a very low theoretical intrinsic noise.

It is yet another object of this invention to provide a magnetic information storage medium with a bit density of $10^{11}$ bits/in$^2$.

It is an additional object of this invention to provide a magnetic information storage medium of the above described kind which consists of magnetic domains no greater than 500 Å (50 nm) in diameter.

It is also an object of this invention to provide a method of manufacturing a high density magnetic storage medium with the above described characteristics.

Summary

Briefly, according to a preferred embodiment of this invention, a high density magnetic information storage medium comprises a thin film which has a plurality of isolated magnetic islands located thereon. The magnetic islands are configured such that ideally only one bit of information is stored on each magnetic island. Preferably, each island is on the order of 200 Å to 500 Å in diameter and is spaced no more than 750 Å from adjacent islands.

The magnetic information storage media of this invention is made by coating a thin film substrate with a uniform layer of suitable magnetic material. Thereafter, the magnetic material is lithographically etched through a mask to produce a regular and uniform array of magnetic islands. The mask used to pattern the photoresist in the lithographic step can be either a metal mask produced by electron beam etching or, preferably, a mask made from an ordered array of polymeric particles.

The mask could, for example, be made of an arrangement of polystyrene spheres which has been fabricated by a spin coating technique.

Alternately, the mask can be generated by using the orienting influence provided by isolating certain polymeric materials at an air-water interface. One approach is to use 50 nanometer diameter colloidal latex particles which have been prepared by emulsion polymerization, An alternative approach is to use block copolymers that contain a surface active block.

The magnetic material on the film must be a thin layer (100 to 200 Å thick) and must be amorphous or have an exceedingly fine microcrystalline structure so that a 500 Å circle will display no significant jaggedness around its edges. One of a number of different types of material that can be used is an amorphous film of TbFeCo with a Terbium (Tb) atomic percentage ranging from 15 to 25% and with an iron/cobalt ratio varying from 10:1 to 1:1. Other alternatives to the TbFeCo family include iron zirconium, iron titanium, cobalt platinum and cobalt palladium.

An advantage of this invention is that it can result in magnetic information storage media with an areal density of as great as $10^{11}$ bits/in$^2$ compared to the best attainable with conventional media of $10^9$ bits/in$^2$. Another advantage is that the storage media of this invention will display a very low noise because of the elimination of the granularity effects in the magnetic switching process.

These and other objects and advantages of the present invention will no doubt become apparent to those skilled in the art after having read the following detailed description of the preferred embodiment which is illustrated in the several figures of the drawing.

DETAILED DESCRIPTION OF THE EMBODIMENTS

1. General Overview

Figure 1:
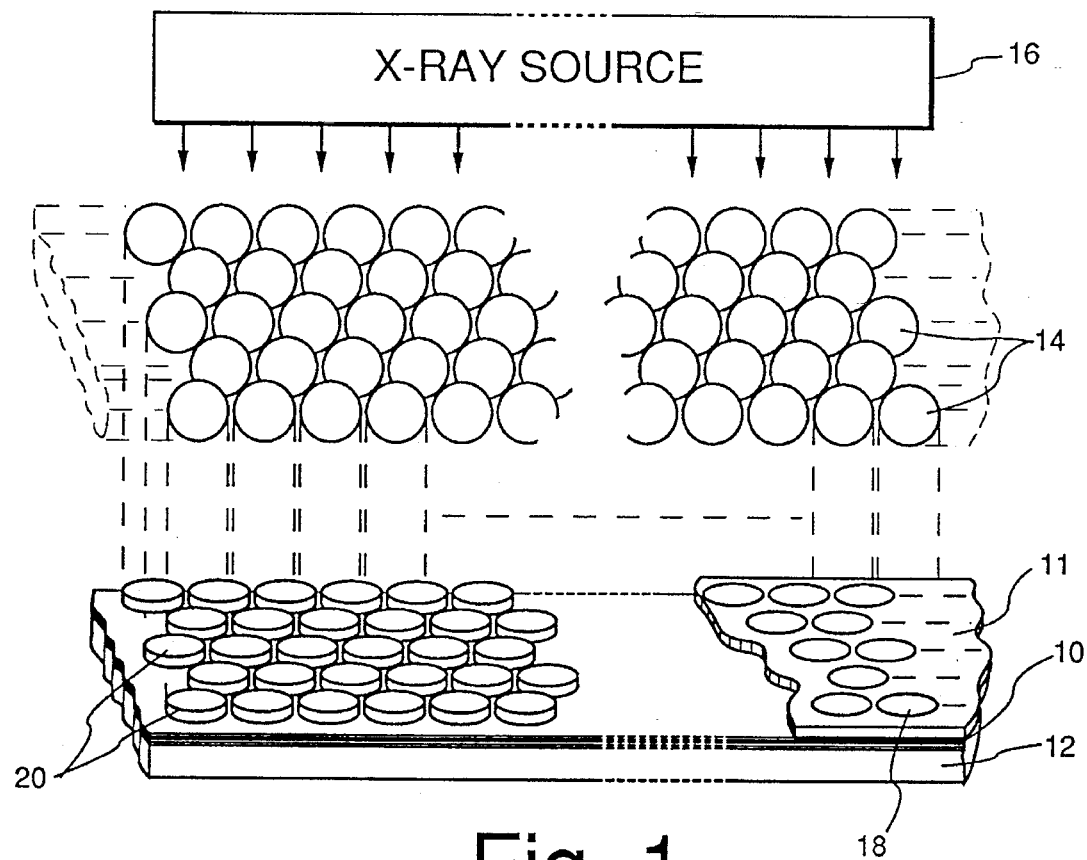
FIG. 1 is an exploded schematic representation illustrating the manufacturing process of the magnetic storage medium of the invention.

The manner in which the ultra-high density magnetic storage media on this invention is manufactured is illustrated in FIG. 1. A thin layer of magnetic material 10, typically between 100 Å and 200 Å thick, is deposited on a substrate, which, in this illustrative embodiment is shown as a film 12. The magnetic layer 10 is then covered by a layer of photoresist, typically an organic polymer shown as a second thin film 11.

A mask 14, the structure and manufacture of which is described below, is moved into place over the photoresist 11 and the photoresist 11 is exposed using lithographic procedures which, in this figure, are represented by the presence of an X-ray source 16. As an alternative to the X-ray source, the exposure can be accomplished by flooding the photoresist 11 with electrons from a suitable source.

As is illustrated in the right-hand portion of this figure, the mask 14, which consists primarily of a plurality of molecular spheres, casts areas of "shadows" 18 onto the photoresist 11. Once the exposure has been completed, the exposed portions of the photoresist are etched away to leave isolated discs 20 of photoresist on the magnetic film 10, a configuration shown on the left-hand side of FIG. 1. The magnetic film 10 is thereafter patterned by conventionally etching away the areas not protected by the discs 20 of photoresist.

Figure 2:
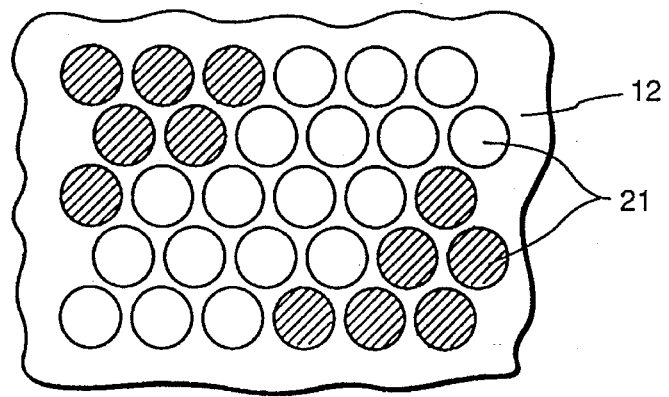
FIG. 2 is a plan view of the storage medium produced by the method illustrated in FIG. 1.

The resulting pattern in the magnetic film is illustrated in FIG. 2, and is an ordered array of magnetic islands 21, each of which can act to store one bit of information.

As can be appreciated, the above is merely an overview of the invention and what follows below is a more detailed description of the various elements making up this invention.

2. Techniques for Patterning the Photoresist

As is indicated above, the thin film 11 of photoresist 10 must be patterned using lithographic techniques to create the required array of circular discs 20. This can be achieved, inter alia, by using either of the two techniques generally used for nanometer scale surface patterning, i.e. electron beam lithography or X-ray lithography using masks.

2.1 Electron Beam Lithography

Although not ideal, it is possible to use electron beam lithographic processes to pattern the photoresist layer. Electron beams can be used for patterning of an organic polymeric photoresist down to 50 nm resolution at moderate electron dosages (0.1 mC/cm$^2$) and so this technique can be used to produce the required array of magnetic islands.

Unfortunately electron beam lithography writing is a serial process, and so the direct beam writing of any significant area is a very time-consuming process. For example, at 50 nm resolution it may take more than an hour to expose one square millimeter of a poly methyl methacrylate (PMMA) resist. As a result, this form of patterning is currently more suited to generating structures needed for research than to the commercial production of magnetic storage media.

2.2 Using a Mask and X-Ray Lithography

From a commercial point of view, however, the patterning of the magnetic storage media can better be achieved by using masks and X-Ray or electron exposure lithography. This is because the patterning time can be greatly reduced if the whole area can be exposed simultaneously.

2.2.1 Metal Mask

One way of achieving this is by using a metal mask which has previously been patterned with an electron-beam technique (similar to that described above) and then flooding the pattern area on a PMMA resist, through the mask, with X-rays in a contact or proximity printer.

2.2.2 Natural Lithography

Even though the above methods of patterning can be employed to provide the desired array of magnetic islands, a preferred method of doing so relies on a method of patterning using a technique known as natural lithography. This technique was first demonstrated by Messrs. Deckman and Dunsmuir who demonstrated the patterning of submicron structures using as a template an array of polystyrene spheres which were rafted together to form an array of 800 nm polystyrene spheres and was fabricated by a spin coating technique.

The patterning of magnetic thin films lends itself well to natural lithography which uses ordered or self-organizing polymers because it is a single-mask operation i.e. there is no need to achieve registry at the nanometer precision level between successive layers of masks, as is required for the fabrication of semiconductor devices.

One method of producing a mask is to use spheres of between 50–80 nm in diameter (which are commercially available for calibration of electron microscopes) and a Langmuir Blodgett trough which can be used as a means for forming the spheres into a monolayer ordered array and then transferring the array onto a solid substrate.

This method is based on the use of the orienting influence provided by isolating certain polymeric materials at an air-water interface. Two different approaches and classes of materials may be used:

(a) Latex Particles, Prepared by Emulsion Polymerization

The first approach is based on the use of 50–80 nanometer diameter colloidal latex particles prepared by emulsion polymerization. Numerous classes of homopolymers and copolymers have been prepared using this route, and it is appropriate for the fabrication of monodisperse size populations. This has commonly been performed using polystyrene (PS) or polymethyl methacrylate (PMMA).

The technology for preparation of colloidal polymer latex particles in the 100 to 1000 nanometer diameter range is well-established (see, for example, H. W. Deckman and J. H. Dunsmuir, J.Vac.Sci.Technol. B1, 1109, (1983)) and the extension thereof to the slightly smaller sized particles can be accomplished through the use of accepted emulsion polymerization methods with control over the ratio of surfactant to monomer content. The particles are stabilized through the use of a combination of Coulombic surface charges and grafted polymer chains that are dissimilar from the base latex material. The fundamental principles behind Coulombic and steric (i.e., with respect to the arrangement of the molecules) stabilization are also well-established (See R. J. Hunter, "Foundations of Colloid Science," Clarendon Press, Oxford, (1987).) Both approaches are employed to prepare the initial emulsion in water, but then subsequently to isolate the resulting latex particles at the air-water interface.

Essentially steric stabilization can be thought of as the coating of each polymer latex particle with a layer of short chain molecules so that one end of each chain molecule sticks out from the latex particle. The resultant combination is a collection of "hairy" spherical particles. The hairs serve to ensure spatial separation between adjacent latex particles. The resulting configuration is a raft of interlocking latex particles which allows rays or electrons to pass between the particles so as to achieve lithographic exposure of the photoresist.

Selection of the particular latex base and the steric stabilizing layer is based on the particular lithographic scheme employed. For example, PMMA can be the appropriate latex base for a patterning scheme using electron beam lithography while the steric stabilizer can be selected to provide suitable lithographic contrast, i.e. to be insensitive to the electron beam irradiation, or even negative acting.

After fabrication of the monodisperse latex, the colloidal particles are organized in a two-dimensional ordered array using the orienting influence of the air-water interface. This can be accomplished by first dialyzing the latex suspension to counteract the effect of the Coulombic stabilization and then spreading the latex on the water surface of a Langmuir trough.

As it is possible that the stability of the latex monolayer could be strongly affected by the nature of the steric stabilizing polymer layer on each particle, the materials fabrication scheme can, in some cases, be an iterative one. The latex must be maintained in suspension without flocculation prior to the spreading on the water, but thereafter, the proper degree of hydrophobicity is required to keep the particles at the water surface. The grafted polymer layer can serve the dual purpose of providing the surface "sequestering" tendency as well as to provide an appropriate buffer material with lithographic contrast to fill the interstices between the (e.g. PMMA) latex particles.

The generation of ordered rafts of the latex particles on the water surface will be a natural consequence if they are sufficiently monodisperse. However, the overall monolayer structure is expected to consist of domains of particles with associated grain boundary defects. A major task in the materials fabrication will be to explore ways of preparing monodomain structures on the water. This may be accomplished through pressure cycling of the barrier on the Langmuir trough. Alternatively, some form of thermal gradient in a two-dimensional "zone refining" approach may be used.

After the monolayer has been annealed and suitably conditioned at the air-water interface, it must be transferred to a substrate, which will consist of the magnetic film material and the photoresist that must be patterned.

This stage introduces a new set of requirements for the grafted polymer layer. It must maintain the separation between the latex particles and adhere sufficiently strongly to the substrate that transfer ratios approaching unity obtained. Following transfer, latex film coalescence will occur as the water drains out of the interstices between the particles. It is important at this stage that the grafted layer is sufficiently defect free such that the lithographic contrast between the latex and the periphery is maintained.

(b) Block Copolymers Containing a Surface Active Block

An alternate approach to the fabrication of the ordered macromolecular arrays is to use block copolymers that contain a surface active block. Each macromolecule in the block copolymer would consist of a long linear chain polymer molecule bonded at one end to another, different chain molecule. Each chain in the macromolecule normally "balls up" which results in a unit of two "molecular clumps" adjacent to one another, with the longer chain (higher molecular weight) polymer molecule forming the bigger ball. There are several possible classes of materials that could be used:

(i) One of the polymers (Type A) making up the block copolymer could have a high molecular weight and be soluble in water while the other polymer (Type B) would have a lower molecular weight and be surface active. In this configuration, the Type A polymer will, when brought into contact with the water, exhibit an expanded chain-like structure, such that chain interpenetration with adjacent molecules will be resisted. The Type B block molecules on the other hand will spread to form a single layer of molecules at the air-water interface to form a condensed, as opposed to an expanded, structure. The resultant configuration of the surface film is then one in which Type B molecules float on the water surface, with the spacing between them governed by the interactions of the Type A molecules in the water subphase.

Figure 3:
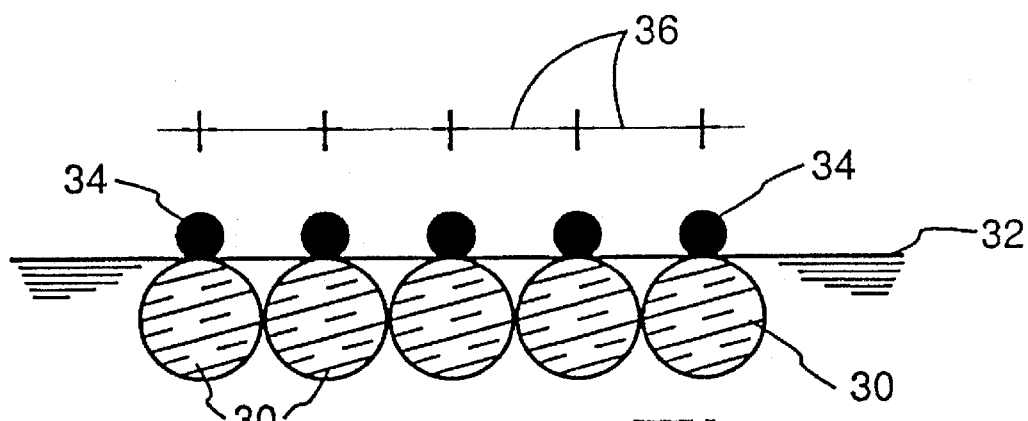
FIGS. 3 and 4 illustrate how different block copolymers can be used to form a mask for use in the manufacturing process illustrated in FIG. 1.

This configuration is schematically illustrated in FIG. 3 in which the Type A molecules 30 are shown below the surface 32 of the water. These big molecules hydrolyze—that is, when put into water, absorbs water molecules and swell up to form a larger "ball." On the other hand, the Type B polymer molecules 34 such that are they seek the water surface 32 but do not hydrolyze and expand. The swollen Type A molecules 30 are rafted together below the water surface 32 and define the lattice spacing 36 between the Type B molecules 34. The Type B molecules 34 are dense enough to block the X-rays or electron beams used during the lithographic etching. The Type B molecules may also be decorated with atoms of a high atomic weight to increase their ability to block the X-rays or electron beams.

(ii) A variation of this theme is provided by the use of a diblock copolymer in which one of the blocks is surface active and consists of molecules (Type C molecules) being of very high molecular weight, while the second block consists of molecules (Type D molecules) being of low molecular weight and being insoluble in the water as well as being non-surface active. In this case, when the copolymer is brought into contact with water, the resulting film at the surface of the water should consist of an essentially continuous film of the Type C molecules, which are "decorated" with islands of the Type D molecules.

Figure 4A:
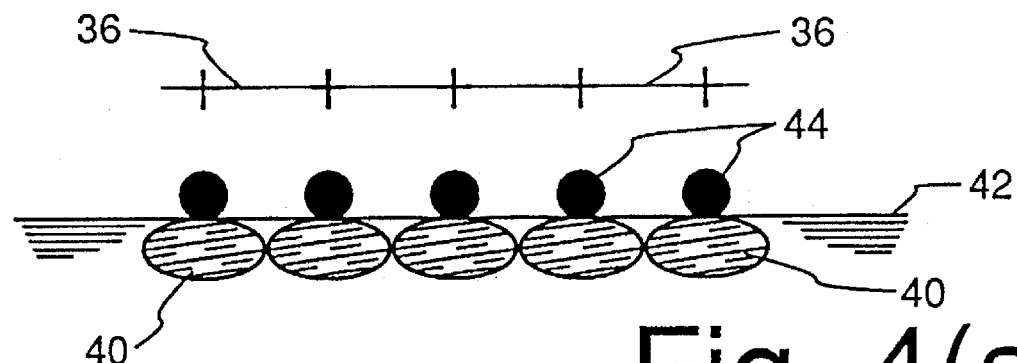
Figure 4B:
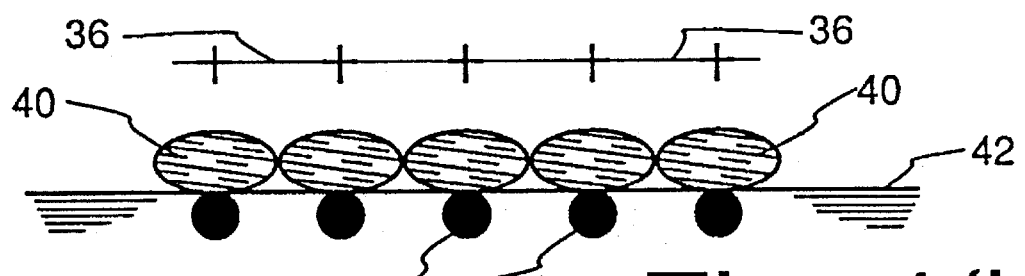

The resulting configuration could be similar to that schematically illustrated in either FIGS. 4(a) or (b) in which the high molecular weight Type C polymer molecules 40 are shown to both seek the surface and expand with the insoluble, lower weight polymer supported thereby.

In both these cases the high molecular weight, water soluble molecules govern the spacing while the lower weight, water insoluble molecules 44 define the mask to be used in the lithographic etching process.

The block-copolymer route has one potential advantage over the latex particle approach to the preparation of the ordered arrays. This is that it may be easier to get good adhesion to the substrate during transfer when working with the surface active material of the block copolymer compared to the latex particles.

3. The Magnetic Medium

The appropriate medium for the ultra-dense memory is a thin film (100 to 200 Å thick) which is either amorphous or has an exceedingly fine microcrystalline structure so that a 500 Å diameter circle will display no significant jaggedness around its edges because of differential microcrystalline etching. Furthermore, if the medium is to be capable of being generated in production quantities, it should not require an oriented single crystal substrate, and, for the same reason, a single-layer film is preferable to a multi-layer film which would require closer sputtering tolerance to preserve layer thicknesses.

A great deal of research and development has, in the past, gone into synthesizing magnetic films having just these characteristics, because almost the same characteristics are required for erasable magneto-optic information storage.

One of the many types of film that can be used is an amorphous film in the TbFeCo family deposited on a glass substrate. Films in this family have been studied over a large range of compositions, with one common and popular composition being $Tb_{23}Fe_{38.5}Co_{38.5}$. In addition, compositions with a Terbium (Tb) atomic percent ranging from 15 to 25 percent and with Iron/Cobalt (Fe/Co) ratios varying from 10:1 to 1:1 have also been shown to exhibit perpendicular magnetization throughout most of this compositional range.

It may, however, be necessary in $Tb_{23}Fe_{38.5}Co_{38.5}$ compositions, to increase the perpendicular anisotropy as much as possible so as to minimize the curling of magnetization at the edges of the islands. It is known that Dysprosium (Dy) increases the magnetic anisotropy of such rare-earth transition-metal compounds, so the inclusion of Dy in the magnetic material may overcome this.

A number of other families of materials are available as alternatives to the TbFeCo or TbDyFeCo family. Polycrystalline but textured Iron Zirconium (FeZr) and Iron Titanium (FeTi) on glass substrates have been found to display perpendicular anisotropy for Zr atomic content in the 10% vicinity and for Ti in the 17% vicinity respectively. These materials display larger saturation magnetization than the TbFeCo films, so are useful for increasing the read-out signal of the small islands.

Much work has also been done on Cobalt Platinum (CoPt) and Cobalt Palladium (CoPd) multilayers as a perpendicular (magneto-optic) recording material. For these films to display perpendicular anisotropy the Co layer thickness must be small, 5 to 25 Å, making deposition control to a high level of precision necessary. Unfortunately, most of the studies on such films have been done for a film which is epitaxially grown on single crystal substrates which makes these types of material practical only in a feasibility exploration but not attractive for a commercial medium.

It will, of course, be realized that the above list of families of materials are examples of only a few of the different families of materials that can be used. Accordingly, this list should not be seen as limiting the scope of this invention.

Another characteristic of the magnetic islands in the high density medium of the invention is that they must have a built-in uniaxial anisotropy, (i.e. a physical property dependent on direction, with a defined "up" and "down" axis), for the material to serve as a memory element. That anisotropy can either be in-plane, in the plane of the film, or perpendicular to the plane of the film, depending on the mode of recording desired.

In-plane anisotropy can be achieved through the interaction of strain with magnetorestriction and perpendicular magnetization can be achieved by composition and by crystallographic orientation of the deposited film.

For the in-plane anisotropy, the magnetic islands should be rod-shaped and deposited on a substrate having a significant (5–10%) lattice mismatch with the magnetic medium. The strain can be either tensile or compressive if combined with the proper sign of magnetostriction. The strain in the rod will be preferentially relieved in the narrow direction, leaving a strain and anisotropic direction along the rod length.

For the perpendicular orientation, a number of materials are known in the transition metal—rare earth alloy family (e.g. FeTb) which displays strong perpendicular orientation in thin film form. The perpendicular magnetization case is probably more practical, since the islands can thus be circular and closely packed, whereas for the rod-shaped islands it might be necessary for the rods to be oriented in a manner such that they are aligned circumferentially, like the grooves in a phonograph record; a requirement that would make the lithography more difficult.

Finally, and for control purposes, it may be necessary to determine and monitor the characteristics of the magnetic film and the array of magnetic islands at various stages in the production process. This can be done in several ways:

The magnetic thin film can be characterized structurally and magnetically in the unpatterned state. It can be characterized ex situ by X-ray diffraction and by transmission electron microscopy. Magnetically they can be characterized in situ by using a surface magneto-optic Kerr effect magnetometer and perhaps ferromagnetic resonance, and ex situ by vibrating sample magnetometry and torque magnetometry.

The shape, size, regularity, and perfection of the magnetic islands produced by the lithography can be determined by using scanning electron microscopy in a conventional manner. Similarly, the characteristics of the ordered polymer array masks can be determined by using scanning electron microscopy.

The individual magnetic domain can be characterized magnetically using a secondary electron microscope with polarization analysis. Present instruments have resolution in the 100 Å to 400 Å range, making them adequate to "read" the magnetization of a single island package with some detail.

To establish the viability of the magnetic array, information must be written into the array and then read. This could be done by writing to the pattern using a sharply tipped magnetic needle mounted on a scanning stage and driven electromagnetically; a species of monopolar vertical write head. The pattern could also, in principle, be read with a secondary electron microscope with polarization analysis.

It is envisaged that the reading from and writing to the magnetic storage medium of this disk will require specific apparatus which has accurate read-drive capabilities particularly with respect to accessing a specific address on the medium. Furthermore, it is possible that, in operation, the magnetic media will remain stationary as information is written to or read from it. This will differ from current rotating media but has the advantage that accessing a specific address on the storage media will be simplified.

Finally, it should be understood that various modifications within the scope of this invention can be made by one of ordinary skill in the art without departing from the spirit thereof. We therefore wish our invention to be defined by the scope of the appended claims in view of the specification as broadly as the prior art will permit.

I claim:

1. A magnetic information storage medium comprising:
a substrate; and
a plurality of discrete, generally disk-shaped, spaced apart bodies of magnetic material disposed on said substrate with a density in excess of $10^9$ bodies/in$^2$, each said body being magnetizable independent of its neighboring bodies and each said body having a maximum diameter of between 200 Å and 500 Å, said bodies being formed by (a) providing a layer of magnetic material on said substrate, said layer being at least 100 Å thick and no greater than 500 Å thick, said magnetic material having uniaxial anisotropy;

(b) providing a layer of photoresist over the layer of magnetic material;

(c) providing a primary mask over said layer of photoresist, said primary mask being formed by an ordered array of discrete generally spherical polymeric particles having a diameter no greater than 750 Å;

(d) exposing said photoresist through said primary mask by flooding it with electrons, said polymeric particles causing generally disk-shaped regions of said layer of photoresist to remain unexposed;

(e) removing said primary mask;

(f) developing said photoresist to leave a plurality of discrete photoresist disks on said layer of magnetic material which form a secondary mask;

(g) subjecting the secondarily masked magnetic film to an etchant to remove magnetic material not covered by said disks; and (h) stripping away the photoresist disks to leave said plurality of disk-shaped bodies of magnetic material disposed on said substrate.

2. A magnetic information storage medium as recited in claim 1 wherein the disk-shaped bodies are spaced at no more than 750 Å center to center.

3. A magnetic information storage medium as recited in claim 1 wherein the disk-shaped bodies comprise a magnetic material which displays magnetic anisotropy.

4. A magnetic information storage medium as recited in claim 3 wherein the disk-shaped bodies are made of a magnetic material from any one of the groups consisting of TbFeCo compositions, TbDyFeCo compositions, FeZr compositions, FeTi compositions, CoPd compositions, and CoPt compositions.

5. A magnetic information storage medium as recited in claim 3 wherein the magnetic material is of a TbFeCo composition, with the atomic percentage of Tb being in the range of 15 to 25% and with the Fe/Co ratio being in the range of 10:1 to 1:1.

6. A magnetic information storage medium as recited in claim 3 wherein the magnetic material is of a FeZr composition and has an atomic percentage of Zr of about 10%.

7. A magnetic information storage medium as recited in claim 3 wherein the magnetic material is of a FeTi composition and has an atomic percentage of Ti of about 17%.

8. A magnetic information storage medium comprising:

a substrate; and a plurality of discrete, spaced apart generally disk-shaped bodies of magnetic material disposed on said substrate with a density in excess of $10^9$ bodies/in$^2$, each said body being magnetizable independent of its neighboring bodies and being between 200 Å and 500 Å in diameter, said bodies being formed of a thin film with no significant jaggedness in its edges.

9. A magnetic information storage medium as recited in claim 8 wherein the islands are made of a magnetic material selected from any one of the groups consisting of TbFeCo compositions, TbDyFeCo compositions, FeZr compositions, FeTi compositions, CoPd compositions, and CoPt compositions.

10. A magnetic information storage medium as recited in claim 9 wherein the magnetic material is of the FeZr family and has an atomic percentage of Zr of about 10%.

11. A magnetic information storage medium as recited in claim 9 wherein the magnetic material is of the FeTi family and has an atomic percentage of Ti of about 17%.

12. A magnetic information storage medium as recited in claim 9 wherein the magnetic material is of a TbFeCo composition with the atomic percentage of Tb being in the range of 15 to 25% and with the Fe/Co ratio being in the range of 10:1 to 1:1.

13. A magnetic information storage medium as recited in claim 9 wherein the magnetic material is of a FeZr composition and has an atomic percentage of Zr of about 10%.

14. A magnetic information storage medium as recited in claim 9 wherein the magnetic material is of a FeTi composition and has an atomic percentage of Ti of about 17%.

* * * * *